United States Patent [19]

Miro

[11] Patent Number: 5,006,618

[45] Date of Patent: Apr. 9, 1991

[54] PROCESS FOR PREPARING HIGH DENSITY OR MEDIUM DENSITY POLYMERS

[75] Inventor: Nemesio D. Miro, League City, Tex.

[73] Assignee: Mobil Oil Corporation, Fairfax, Va.

[21] Appl. No.: 473,076

[22] Filed: Jan. 31, 1990

Related U.S. Application Data

[60] Division of Ser. No. 253,803, Oct. 5, 1988, Pat. No. 4,912,074, which is a continuation-in-part of Ser. No. 144,821, Jan. 15, 1988, Pat. No. 4,831,000.

[51] Int. Cl.$^5$ ............................................. C08F 4/646
[52] U.S. Cl. .................................... 526/116; 502/113; 526/348.2
[58] Field of Search ............................. 526/116, 142

[56] References Cited

U.S. PATENT DOCUMENTS

| | | | |
|---|---|---|---|
| 3,135,809 | 6/1964 | Bosmaiian | 260/650 |
| 3,412,174 | 11/1968 | Kroll | 260/683.9 |
| 3,899,477 | 8/1975 | Altemore et al. | 526/116 |
| 3,956,255 | 5/1976 | Ort | 526/352 |
| 4,333,851 | 6/1982 | Speakman et al. | 526/116 X |
| 4,396,533 | 8/1983 | Johnstone | 252/429 |
| 4,434,242 | 2/1984 | Roling et al. | 526/142 X |
| 4,435,518 | 3/1984 | Pennington et al. | 526/142 X |
| 4,435,519 | 3/1984 | Veazey et al. | 526/142 X |
| 4,435,520 | 3/1984 | Alyward | 502/107 |
| 4,508,842 | 4/1985 | Beran et al. | 502/112 |
| 4,530,913 | 7/1985 | Pullukat et al. | 502/104 |
| 4,578,374 | 1/1987 | Best | 526/142 X |
| 4,579,834 | 4/1986 | Best | 526/142 X |
| 4,579,835 | 8/1986 | Best | 502/120 |
| 4,593,009 | 6/1986 | Nowlin | 526/116 X |
| 4,607,019 | 3/1986 | Best | 526/142 X |
| 4,634,751 | 4/1986 | Best | 526/129 |
| 4,831,000 | 5/1989 | Miro | 526/116 X |
| 4,866,021 | 9/1989 | Miro et al. | 526/116 X |
| 4,972,033 | 11/1990 | Miro | 526/116 |

OTHER PUBLICATIONS

Carrick et al., Journal of American Chemical Society, vol. 82, p. 1502 (1960) and vol. 83, p. 2654 (1961).
Miro et al., U.S. Application Ser. No. 376,077, filed 7/5/89.
Furter et al., U.S. Application Ser. No. 253,935, filed 10/5/88.

*Primary Examiner*—Patrick P. Garvin
*Attorney, Agent, or Firm*—Alexander J. McKillop; Charles J. Speciale; Marina V. Schneller

[57] ABSTRACT

There is disclosed a catalyst composition for the polymerization of olefins, particularly alpha-olefins. The composition is prepared by synthesizing a catalyst precursor and then combining it with a conventional catalyst activator. The precursor is synthesized by: (a) contacting a solid, porous carrier with an aluminum compound; (b) contacting the resulting product with a mixture of vanadium and titanium compounds; and, (c) contacting the product with an ether.

The catalyst composition is used with a conventional activator and, preferably, a halogenating agent in the polymerization medium to produce broad molecular weight distribution, high molecular weight HDPE or medium density, broad molecular weight distribution, high molecular weight resins which can be made into high strength films.

22 Claims, No Drawings

PROCESS FOR PREPARING HIGH DENSITY OR MEDIUM DENSITY POLYMERS

CROSS-REFERENCE TO RELATED APPLICATIONS

This is a divisional of Ser. No. 253,803, filed on Oct. 5, 1988, now allowed, now U.S. Pat. No. 4,921,074 which was a continuation-in-part of Ser. No. 144,821, filed on Jan. 15, 1988, now U.S. Pat. No. 4,831,000, the entire contents of both of which are incorporated herein by reference.

BACKGROUND OF THE INVENTION

1. Field of the Invention

The invention relates to a catalyst composition for polymerizing olefins, particularly alpha-olefins, a method for producing such a catalyst and to a method of polymerizing olefins with such a catalyst. More particularly, the invention relates to a high activity catalyst composition which can be used to produce either high density, high molecular weight olefin polymers, or medium density, high molecular weight olefin polymers, both of which can be used to produce high strength film products. The invention is also directed to a polymerization process utilizing such a catalyst composition.

2. Description of the Prior Art

Linear low density polyethylene (LLDPE) polymers possess properties which distinguish them from other polyethylene polymers, such as ethylene homopolymers. Certain of these properties are described by Anderson et al, U.S. Pat. No. 4,076,698. The LLDPE polymers are usually prepared from alpha-olefins in the presence of catalysts commonly referred to as Ziegler or Ziegler-Natta catalysts. Such catalysts usually contain various combinations of a magnesium compound, a compound of a transition metal, e.g., titanium or vanadium, and a co-catalyst, e.g., an aluminum alkyl.

Graff, U.S. Pat. No. 4,173,547, Stevens et al, U.S. Pat. No. 3,787,384, Strobel et al, U.S. Pat. No. 4,148,754, and Ziegler, deceased, et al, U.S. Pat. No. 4,063,009, each describe various polymerization processes suitable for producing forms of polyethylene other than linear low density polyethylene.

Stevens et al, U.S. Pat. No. 3,787,384, and Strobel et al, U.S. Pat. No. 4,148,754, describe catalysts prepared by first reacting a support (e.g., silica containing reactive hydroxyl groups) with an organomagnesium compound (e.g, a Grignard reagent) and then combining this reacted support with a tetravalent titanium compound.

Ziegler, deceased, et al, U.S. Pat. No. 4,063,009, describe a catalyst which is the reaction product of an organomagnesium compound (e.g., an alkylmagnesium halide) with a tetravalent titanium compound The reaction of the organomagnesium compound with the tetravalent titanium compound takes place in the absence of a support material Thus, catalysts used for producing LLDPE resins usually contain a transition metal or a compound thereof and magnesium or a compound thereof Such catalysts are intended for the production of LLDPE polymers having relatively low density (0.930 g/cc or less) and narrow molecular weight distribution (low MFR), since low MFR values are thought to be responsible for good strength properties of the films made from such polymers With some catalysts disclosed in the patents and publications discussed below, high yields of good quality, high molecular weight, polymers of ethylene and other olefins may be produced. Generally, these are linear polymers of high density, i.e., 0.930 g/cc and above, referred to in the art as high density polyethylene (HDPE), with the molecular weight of the polymers falling within a wide range of 2,000 to 300,000 or more. The density and molecular weight characteristics of these polymers render them satisfactory for many uses and they have, in fact, in recent years found extensive commercial use in a variety of applications. However, the polymer products obtained are not always suitable for specialty uses because they do not have the desired molecular weight distribution. Generally, high density and high molecular weight polymers are preferred for their superior strength characteristics. However, such polymers tend to have narrow molecular weight distribution, MWD (as evidenced by low values of melt flow ratio, MFR,) and relatively low values of high load melt index ($I_{21}$) which renders them difficult and expensive to process, i.e., they require a high extrusion pressure for processing, thereby resulting in low productivity and high cost per unit of product. Therefore, it is desirable to provide a catalyst producing high density, low $I_{21}$ polymers having comparatively broad molecular weight distribution (high MFR) since such polymers can be easily processed and they have satisfactory strength properties.

A vanadium-containing catalyst, used in conjunction with triisobutylaluminum as a co-catalyst, is disclosed by W. L. Carrick et al, in *Journal of American Chemical Society*. Volume 82, page 1502 (1960) and Volume 83, page 2654 (1961).

Altemore et al, U.S. Pat. No. 3,899,477, disclose a catalyst comprising a titanium halide, a vanadium halide and an organoaluminum compound. The catalyst is admixed with a mixture of an alkylaluminum sesquiethoxide and a trialkylaluminum prior to the use thereof in the polymerization of ethylene to produce high molecular weight and broad molecular weight distribution polymers. The catalyst may be supported on a support by preparing a solution or a slurry thereof and admixing it thoroughly with the support.

Speakman et al, U.S. Pat. No. 4,333,851, disclose a supported Ziegler catalyst for polymerizing 1-olefins, prepared by reacting a refractory oxide support, e.g., silica, with an organometallic compound, e.g., trihydrocarbyl aluminum, such as triethyl aluminum or diethyl aluminum chloride; separating unreacted organometallic compound; impregnating the resulting solid product with a halogen-containing titanium compound and a halogen-containing vanadium compound; and separating unabsorbed titanium and vanadium compounds. The catalyst is used in the presence of a conventional Ziegler activator to polymerize 1-olefins to polymers having relatively narrow molecular weight distribution.

Pullukat et al, U.S. Pat. No. 4,530,913, disclose a 1-olefin polymerization catalyst prepared by reacting a monofunctional organic silicon compound with silica or alumina; reacting the resulting product with a Group II A organometalic compound or complex, e.g., a compound of calcium or magnesium; and reacting the product with a halide or alkoxide of a metal of Group IVB or VB or mixtures thereof, e.g., halides or alkoxides of titanium, zirconium or vanadium.

Ort, U.S. Pat. No. 3,956,255, discloses a supported catalyst composition made by depositing on a previously-treated silica gel a compound of vanadium, a trialkyl aluminum, and an alkylaluminum alkoxide. The silica is treated with an alkylaluminum, an alkylaluminum alkoxide or mixtures thereof to provide a catalyst of high activity.

Best, U.S. Pat. No. 4,607,019, discloses an olefin polymerization catalyst composition producing high molecular weight and broad molecular weight distribution polyolefins comprising a vanadium-containing catalyst component and an aluminum alkyl co-catalyst. The vanadium-containing catalyst component is prepared by contacting an inert support with an organoaluminum compound, a halogenating agent and a vanadium compound.

Best, U.S. Pat. Nos. 4,579,835 and 4,634,751, disclose vanadium-based olefin polymerization catalyst compositions comprising a support material, treated with an organoaluminum compound, an alkyl halide and a vanadium compound, activated with an alkylaluminum cocatalyst.

Best, U.S. Pat. Nos. 4,578,374 and 4,579,834, disclose vanadium- and magnesium-containing supported olefin polymerization catalyst compositions.

SUMMARY OF THE INVENTION

The catalyst composition of this invention contains no magnesium and it can produce either HDPE or medium density products having controlled molecular weight distribution, depending on the polymerization reaction conditions.

A supported olefin, particularly alpha-olefin, polymerization catalyst composition is obtained by synthesizing a precursor composition and then combining it with a catalyst activator, also known as a co-catalyst. The precursor composition is synthesized in a multi-step process summarized below. In the first step, a solid, porous carrier is contacted with an aluminum compound of the formula $$R_k AlZ_{(3-k)} \qquad (I)$$

where Z is a halogen, R is a $C_1$–$C_{10}$ alkyl group and k is 1, 2 or 3. In the second step, the resulting product is contacted with a mixture of a vanadium compound of the formula $$VO_m X_{(n-2m)} \qquad (II)$$

where X is a halogen, m is 0 or 1, and n is 2, 3, 4 or 5, and a titanium compound of the formula $$Ti X_4' \qquad (III)$$

where X' is a halogen. In the third step, the product is contacted with an alkyl ether having 2 to 18 carbon atoms, an alkyl/aryl ether having 2 to 18 carbon atoms or a silane either of the formula $$R''Si(OR''')_m R^{IV}_{(3-m)} \qquad (IV)$$

where R", R'" and $R^{IV}$ are the same or different alkyl or aryl groups and m is 1, 2 or 3. In the fourth step, the product of the third step is dried by evaporation or distillation to remove all solvents therefrom. All of the catalyst synthesis steps (the contacting steps) are preferably conducted in the presence of a suitable solvent, e.g., a non-polar solvent, such as an alkane. The aluminum compound of formula (I), the vanadium compound, the titanium compound, and the ethers must be liquids or they must be soluble in the solvent used in the synthesis.

The resulting catalyst precursor is then combined with a conventional co-catalyst (also known as a catalyst activator), e.g., one or more aluminum alkyls, to form an active catalyst composition.

The catalyst composition is used, preferably with a halogenating agent in the polymerization reactor to increase activity of the catalyst, to produce high molecular weight, broad molecular weight distribution HDPE or medium density resins which produce films having excellent strength properties.

DETAILED DESCRIPTION OF THE INVENTION

Carrier Materials

Suitable carriers are any solid support materials used to support alpha-olefin polymerization catalyst compositions. Such carriers are preferably solid, inorganic, porous materials, such as silica, alumina and combinations thereof, which contain reactive OH groups. The carrier materials may be amorphous or crystalline.

Examples of suitable carrier materials are described by Graff, U.S. Pat. No. 4,173,547, and by Stevens et al, U.S. Pat. No. 3,781,636, the entire contents of both of which are incorporated herein by reference. Polymeric silicas, known as polysiloxanes, can also be used as suitable carrier materials.

The carrier materials may be in the form of particles having a particle size of from about 0.1 micron to about 200 microns, more preferably from about 10 to about 150 microns. Preferably, the carrier is in the form of spherical particles, e.g., spray-dried silica. The internal porosity of the carriers is larger than 0.2 cm$^3$/g, preferably larger than about 0.6 cm$^3$/g. The specific surface area of the carriers is larger than about 50 m$^2$/g, preferably it is about 150 to 1500 m$^2$/g. In the most preferred embodiment, the carrier is silica which has been dehydrated by fluidizing it with air and heating at about 600° C. for about 8 to 16 hours to achieve a surface hydroxyl groups concentration of about 0.7 millimoles/gram (mmols/g). The silica of the most preferred embodiment is a high surface area, amorphous silica (surface area of about 300 m$^2$/g; pore volume of about 1.50 cm$^3$/g), and it is a material available under the tradename of Davison 955 from the Davison Chemical Division of W.R. Grace and Company. The silica is in the form of spherical particles, e.g., as obtained by a spray-drying process.

Internal porosity of the carriers can be determined by a BET-technique, described by S. Brunauer, P. Emmett and E. Teller in *Journal of the American Chemical Society*, 60, pp. 209–319 (1938). Specific surface area of carriers can also be measured in accordance with the aforementioned BET-technique, with the use of the standardized method, as described in British Standards BS 4359, Volume 1 (1969).

It is desirable to remove physically bound water from the carrier material prior to using the material in the catalyst synthesis. The water removal step may be accomplished by heating the carrier material in an oxygen-containing gas to a temperature of from about 100° C. to an upper limit of temperature represented by the temperature at which a change of state or sintering occurs. Suitable temperatures are from about 100° C. to about 1000° C., preferably from about 300° C. to about 700° C., and most preferably about 600° C.

Chemically bound water, e.g., as represented by the presence of the OH groups on the carrier, may be present on the carrier. Excess OH groups may be removed by heating the carrier, prior to the use thereof in the catalyst synthesis method of this invention, for a sufficient time at a sufficient temperature to accomplish the desired degree of the OH groups removal. For example, a relatively small number of OH groups may be removed by heating the carrier from about 150° C. to about 250° C., whereas a relatively large number of OH groups may be removed by heating at 500° C. to 600° C. The heating is continued for about 4 to about 16 hours. The amount of the hydroxyl groups in silica may be determined according to the method disclosed by J. B. Peri and L. L. Hensley, Jr., in *J. Phys. Chem.* 72(8), 2926 (1968), the entire contents of which are incorporated herein by reference.

While heating is the most preferred means of removing the OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound, e.g., triethylaluminum.

Catalyst Precursor Synthesis

The carrier is contacted with an aluminum compound of the formula $$R_k AlZ_{(3-k)} \tag{I}$$

where R is a $C_1$–$C_{10}$ alkyl group, preferably a $C_2$–$C_5$ alkyl group, Z is a halogen and k is 1, 2 or 3 Suitable aluminum compounds are any aluminum compositions known and used as Ziegler-Natta co-catalysts or activators which are defined by the compounds of formula (I). Mixtures of such compounds may also be used in this step. Specific examples of aluminum compounds useful in the first catalyst synthesis step are trimethylaluminum, triethylaluminum, tripropylaluminum, triisopropylaluminum, tributylaluminum, triisobutylaluminum, tripentylaluminum, tri-n-hexylaluminum, triheptylaluminum, diethylaluminum chloride and ethylaluminum dichloride. The most preferred aluminum compound is triethylaluminum (TEAL). The amount of the aluminum compound is such that the ratio of aluminum (Al), derived from the aluminum compound, per weight unit of the carrier is about 0.5 to about 2.0, preferably about 0.80 to about 1.3, and most preferably about 1.0 mmoles of Al per gram (g) of carrier.

The preferred method of contacting the carrier with the aluminum compound of formula (I) comprises initially forming a slurry of the carrier in a non-polar solvent, and then adding thereto a solution of the aluminum compound in the non-polar solvent. The slurry is then preferably brought to a reflux temperature and refluxed for a sufficient time to complete the reaction of the aluminum compound with the carrier.

In this specification, whenever proportions of any catalyst ingredients are given in terms of ratios of such ingredients per weight unit of the carrier, the specified weight of the carrier is that of Davison 955 silica after it was dried at 600° C. for about 16 hours (hrs). Thus, in the aforementioned ratios of the aluminum compound, the vanadium and titanium compounds, and of the ethers, discussed below, per unit weight of the carrier, the weight of the carrier is that of Davison 955 silica which has been dried at 600° C. for about 16 hrs. It will be apparent to those skilled in the art that if any other support is used in the synthesis, the weight thereof relative to the various ingredients used in the catalyst synthesis may have to be recalculated to maintain the herein-specified ratios of the respective ingredients to the weight of the Davison 955 support specified herein. In the synthesis of the catalyst of this invention, it is important that all of the catalyst reagents are added to the synthesis mixture in such amounts that each of the reagents substantially completely reacts with the carrier or with a catalyst intermediate formed on the carrier during synthesis steps preceding the addition of a given reagent. This is important to assure that substantially all of the catalytically-active species are supported chemically, physically or by any other means in or on the carrier. Accordingly, if carriers other than the Davison 955 silica or equivalent silicas, heated at 600 C for about 16 hrs, are used, the respective amounts of each of the catalyst ingredients may have to be initially determined experimentally to produce the catalyst of this invention having substantially all of the catalytically-active species supported in or on the carrier. Without wishing to be bound by any theory of operability, it is believed that if an appreciable amount of any catalytically-active species of this catalyst is not supported in or on the carrier, the resulting catalyst may produce polymer fines when it is used to polymerize olefins and/or may have other process-related disadvantages.

Subsequently, the slurry is preferably allowed to cool, usually to the ambient temperature, and it is then contacted with a mixture of the vanadium compound and the titanium compound. Preferably, the mixture of the vanadium and titanium compounds is homogenized before it is used to contact the slurry. The vanadium compound has the formula $$VO_m X_{(n-2m)} \tag{II}$$

where X is a halogen, preferably Br or Cl, and most preferably Cl, m is 0 or 1, preferably 1, and n is 2, 3, 4 or 5, preferably 5. The most preferred vanadium compound is vanadium oxytrichloride, $VOCl_3$.

The titanium compound has the formula $$TiX'_4 \tag{III}$$

where X' is a halogen, preferably Cl.

The mixture is also preferably added to the slurry as a solution in a non-polar solvent. After the mixture is added to the slurry, the resulting slurry is preferably brought to the reflux temperature and refluxed for a sufficient time to substantially completely react the carrier of the first synthesis step with the titanium and vanadium compounds.

The amount of the vanadium compound is such that the ratio of the elemental vanadium, (V), derived from the vanadium compound, per weight unit of the carrier is about 0.3 to about 2.0, preferably about 0.7 to about 1.3, and most preferably about 1 mmole of V per gram of the carrier. The amount of the titanium compound is such that the ratio of the elemental titanium (Ti), derived from the titanium compound, per unit weight of the carrier is about 0.05 to about 1.0, preferably about 0.1 to about 0.4, and most preferably about 0.2 mmole of Ti per gram of the carrier.

The resulting product is contacted with an alkyl ether having 2 to 18 carbon atoms, an alkyl/aryl ether or a silane ether of the formula $$R''Si(OR''')_m R^{IV}_{(3-m)} \quad (IV)$$

where R , R''' and are the same or different alkyl or aryl groups, preferably R is an aryl group and R''' and 1, 2 or 3. preferred alkyl or alkyl/aryl ethers are cyclic alkyl ethers of 2–7 carbon atoms, such as tetrahydrofuran and lower alkyl/aryl ethers, such as phenylmethyl ether, and preferred silane ethers are silane ethers containing lower alkyl groups, such as phenyltrimethoxy silane and phenyldimethoxymethyl silane. The most preferred ethers are tetrahydrofuran or phenyltrimethoxysilane. The amount of the ether is about 0.1 to about 2.0, preferably about 0.5 to about 1.5, and most preferably about 1.0 mmoles of an alkyl or alkyl/aryl ether per gram of the carrier, and from about 0.25 to about 1.0, preferably about 0.25 to about 0.5 mmole, of a silane ether per gram of the carrier. The ether is also preferably added in the form of a solution thereof in a non-polar solvent. The resulting slurry is preferably brought to a reflux temperature and refluxed for a sufficient time to react substantially all of the ether with the heretofore-synthesized catalyst precursor intermediate. Subsequently, the solvent is removed, e.g., by decantation or evaporation, preferably under nitrogen pressure at 50°–80° C. for about 3 to about 4 hrs, to obtain a dry, solid catalyst precursor. All of the aforementioned catalyst precursor synthesis steps are conducted at a substantially ambient pressure at about 25° to about 95° C.

In all of the aforementioned catalyst precursor synthesis steps, preferably the same non-polar solvent is used in each step, but different, yet compatible non-polar solvents may also be used. The term "compatible" in relation to polar solvents is used herein to define solvents which can be safely combined with each other as pure solvents or as slurries of any of the reactants discussed above in such solvents without causing a detrimental chemical reaction between the solvents or the slurries.

Suitable non-polar solvents are materials in which the compounds of formulae (I)–(IV) are at least partially soluble and which are liquid at the catalyst precursor synthesis temperature. Preferred non-polar solvents are alkanes, such as hexane, n-heptane, octane, nonane and decane, although a variety of other materials including cycloalkanes, such as cyclohexane, aromatics, such as benzene and ethylbenzene, may also be used. The most preferred non-polar solvent is hexane. Prior to use, the non-polar solvent should be purified, such as by percolation through silica gel and/or molecular sieves, to remove traces of water, oxygen, polar compounds, and other materials capable of adversely affecting catalyst activity.

CATALYST aCTIVATION

The supported catalyst precursor, formed in the multi-step catalyst synthesis procedure described above, is activated with suitable activators, also known as promoters. The activators are known in the art and they include any of the materials commonly employed as promoters for olefin polymerization catalyst components containing compounds of the Groups IB, IIA, IIB, IIIB and IVB of the Periodic Chart of the Elements, published by Fisher Scientific Company, Catalog Number 5-702-10, 1978. Examples of such promoters are metal alkyls, hydrides, alkylhydrides, and alkyhalides, such as alkyllithium compounds, dialkylzinc compounds, trialkylboron compounds, trialkylaluminum compounds, alkylaluminum halides and hydrides, and tetraalkylgermanium compounds. Mixtures of such compounds may also be employed. Specific examples of useful promoters include n-butyllithium, diethylzinc, di-n-propylzinc, triethylboron, triethylaluminum, triisobutylaluminum, tri-n-hexylaluminum, ethylaluminum dichloride, dibromide, and dihydride, isobutylaluminum dichloride, dibromide, and dihydride, diethylaluminum chloride, bromide, and hydride, di-n-propylaluminum chloride, bromide, and hydride, diisobutylaluminum chloride and hydride, tetramethylgermanium, and tetraethylgermanium. Organometallic promoters which are preferred in this invention are Group IIIB metal alkyls and dialkylhalides having 1 to about 20 carbon atoms per alkyl radical. More preferably, the promoter is a trialkylaluminum compound having 1 to about 6 carbon atoms per alkyl radical. The most preferred promoter is triethylaluminum (TEAL). Other promoters which can be used herein are disclosed by Stevens et al, U.S. Pat. No. 3,787,384, column 4, line 45 to column 5, line 12, and by Strobel et al, U.S. Pat. No. 4,148,754, column 4, line 56 to column 5, line 59, the entire contents of both patents being incorporated herein by reference.

The organometallic promoter is employed in an amount which is at least effective to promote the polymerization activity of the solid catalyst precursor component of the catalyst of this invention. Preferably, at least about three moles of the promoter are employed per mole of the sum of elemental titanium (Ti) and vanadium (V), derived from the titanium and vanadium compounds, respectively, on the solid catalyst precursor component, although higher ratios, such as 10:1, 25:1, 100:1 or higher, are also suitable and often give highly beneficial results.

The catalyst precursor may be activated in situ by adding the activator and catalyst precursor separately to the polymerization medium. It is also possible to combine the catalyst precursor and the activator before the introduction thereof into the polymerization medium, e.g., for up to about 2 hours prior to the introduction thereof into the polymerization medium at a temperature of from about −40 to about 100° C. It is preferred, however, to activate the catalyst activator in situ, in the polymerization medium.

It is notable that the catalyst of this invention is synthesized on a support which does not require an alkoxide activator, e.g., an alkylaluminum sesquiethoxide, nor the use of alkyl halides during the synthesis and it is prepared in the absence of magnesium compounds.

Polymerization

Olefins, especially alpha-olefins may be polymerized with the catalysts of this invention by any suitable process. Such processes include polymerizations carried out in suspension, in solution or in the gas phase. Gas phase polymerization reactions are preferred, e.g., those taking place in stirred bed reactors and, especially, fluidized bed reactors.

The polymerization is preferably conducted in the presence of a halogenating agent added to the polymerization reactor. Without wishing to be bound by any theory of operability, it is believed that the halogenating agent improves activity of the catalyst and increases the MFR values, and thus broadens the molecular weight distribution of the resins.

The halogenating agent has the empirical formula $$MH_nX''_{(p-n)} \qquad (VI)$$

where M is Si, C, Ge or Sn, preferably Si or C, and most preferably C, X'' is a halogen, preferably Cl or Br, and most preferably Cl, n is 0, 1, 2 or 3, and p is the valence of M. Suitable halogenating agents are methylene chloride, chloroform, carbon tetrachloride, dichlorosilane, trichlorosilane and silicon tetrachloride. When M is C, halogenated hydrocarbons containing 1 to 6 carbon atoms can be used, such as those identified by tradenames of Freon 11, 12, 14 and Freon 114, available from E. I. DuPont de Nemours and Co. The most preferred halogenating agent is chloroform, $CHCl_3$, or one of the aforementioned Freons. The molar ratio of the halogenating agent to the activator is about 0.1 to about 10, preferably about 0.5 to about 2.0 to obtain HDPE polymers of broad MWD (MFR of about 110 to about 190, preferably about 135 to about 150) and about 0.1 to about 10, preferably about 0.5 to about 2.0 to obtain medium density, broad MWD polymers (MFR of about 110 to about 190, preferably about 135 to about 150). These amounts are based on the content of the halogenating agent in the total amount of the solvent used in slurry polymerizations, or on the total bed weight of gas-phase polymerization reactions. The HDPE polymers prepared in the presence of the catalysts of this invention have a density of about 0.941 to about 0.953, most preferably about 0.946 g/cc, and $I_{21}$ values of about 5 to about 12, most preferably about 6 g/10 min. They are useful for the production of high molecular weight, high strength film. The medium density polymers have a density of about 0.928 to about 0.940, most preferably about 0.936 g/cc and $I_{21}$ values of about 5 to about 12, most preferably about 6 g/10 min. Such polymers are also useful for the production of high molecular weight, high strength film.

The molecular weight of the polymer is controlled in a known manner, e.g., by using hydrogen. With the catalysts produced according to the present invention, molecular weight may be suitably controlled with the hydrogen when the polymerization is carried out at relatively low temperatures, e.g., from about 30° to about 105° C. This control of molecular weight may be evidenced by a measurable positive change in melt index ($I_2$) of the polymer produced.

The HDPE polymers are prepared by polymerizing ethylene, optionally with small amounts of higher alpha-olefins, such as n-butene, n-hexene or n-octene in the presence of the catalyst of this invention. The amounts of higher alpha-olefins used in the reactor are such that the mole percent of the higher alpha-olefin in the polymer product is about 0.1 to about 1.0. The medium density polymers are prepared by polymerizing ethylene with larger amounts of higher alpha-olefins, such as n-butene, n-hexene or n-octene in the presence of the catalyst of this invention. For the medium density polymers, the amounts of higher alpha-olefins used in the reactor are such that the mole percent of the higher alpha-olefin in the polymer product is about 0.1 to about 2.0. The molecular weight distribution of both the HDPE and the medium density polymers made with the catalyst of this invention can be varied by varying the amounts of a halogenating agent used during the polymerization process. The higher the amount of a halogenating agent, the broader the molecular weight distribution (the higher the MFR value). Thus, the polymers may have MFR values ranging from about 110 to about 190, depending on the amount of a halogenating agent present during the polymerization reaction. As is known to those skilled in the art, such MFR values are indicative of a relatively broad molecular weight distribution of the polymers. As is also known to those skilled in the art, such MFR values are indicative of the polymers especially suitable for high density and medium density, high molecular weight film applications since such polymers offer superior toughness, stiffness, and tensile strength properties as compared to LLDPE polymers which are better known for their excellent tear strength and puncture resistance properties. MFR is defined herein as the ratio of the high load melt index (HLMI or $I_{21}$) divided by the melt index ($I_2$), i.e., $$MFR = \frac{I_{21}}{I_2}$$

Low MFR values indicate relatively narrow molecular weight distribution and high MFR values relatively broad molecular weight distribution of the polymers.

Copolymers prepared with the catalyst of this invention may have two monomeric units or they may be terpolymers having three monomeric units. Particular examples of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting polyethylene polymer preferably has at least one other alpha-olefin comonomer having at least four carbon atoms in an amount of at least 1 percent by weight of the polymer. Accordingly, ethylene/propylene copolymers are possible, but not preferred. The most preferred comonomer is 1-hexene.

A particularly desirable method for producing polymers according to the present invention is in a fluid bed reactor. Such a reactor and means for operating it are described by Levine et al, U.S. Pat. No. 4,011,382, Karol et al, U.S. Pat. No. 4,302,566, and Nowlin et al, U.S. Pat. No. 4,481,301, the entire contents of all of which are incorporated herein by reference. The polymer produced in such a reactor contains catalyst particles since the catalyst is not separated from the polymer.

The catalysts prepared according to the present invention are highly active and they may have an activity of at least about 3000 grams of polymer per gram of catalyst.

The following Examples further illustrate some features of the invention. However, it will be apparent to those skilled in the art that the specific reactants and reaction conditions used in the Examples do not limit the scope of the invention.

The properties of the polymers produced in the Examples were determined by the following test methods:

| | |
|---|---|
| Density | ASTM D-1505 - A plaque is made and conditioned for one hour at 100° C. to approach equilibrium crystallinity. Measurement for density |

-continued

| | |
|---|---|
| | is then made in a density gradient column; reported as gms/cc. |
| Melt Index (MI), $I_2$ | ASTM D-1238 - Condition E - Measured at 190° C. - reported as grams per 10 minutes (gms/10 min). |
| Melt Extrusion Rate, $I_5$ | ASTM D-1238 - Condition G, using 5000 grams weight. |
| Melt Extrusion Rate, $I_{10}$ | ASTM D-1238 - Condition N, using 1000 grams weight. |
| High Load Melt Index (HLMI, $I_{21}$) | ASTM D-1238 - Condition F - Measured at 10 times the weight used in the melt index ($I_2$) test above. |
| Melt Flow Ratio (MFR) = | $\frac{I_{21}}{I_2}$ |
| Productivity | The polymer after each polymerization is dried in a vacuum oven and productivity is calculated by dividing the polymer weight times 100 by weight of catalyst used, partial pressure of ethylene and the length of polymerization in hours. |
| Dart Drop | ASTM D-1709, reported as F50 value in grams |
| Elmendorf Tear, MD | ASTM D-1922, reported in g/mil |
| Elmendorf Tear, TD | ASTM D-1922, reported in g/mil |

EXAMPLE 1

(Catalyst Synthesis)

Catalyst Precursor Synthesis

The preparation was conducted under nitrogen atmosphere. 407 grams of Davison 955 silica (previously calcined at 600° C. for 16 hours under a purge of dry nitrogen) was placed in a nitrogen-purged glass reactor at room temperature, to which then was added 2 liters of dry n-hexane, slightly pressurized with nitrogen. While agitating the silica slurry at room temperature, 26.5 mls of a triethylaluminum (TEAL) solution in heptane (24% by weight TEAL) was added from a pressure vessel over a period of 10 minutes. The mixture was brought to 60° C. and stirred for one hour and then was cooled to 40° C. A mixture comprised of 8.95 ml of neat $TiCl_4$ and 38.6 ml of neat $VOCl_3$ was prepared in 200 ml of dry hexane solvent in a glove box and then transferred to a metallic pressure container while still in the glove box. The metallic container was removed from the glove box, connected to the glass reactor and the mixture was added over a 15 minute time period to the silica slurry. The final slurry was brought to 60° C. and stirred for 1.0 hour. Then, the slurry was cooled to 40° C. and 33.1 mls of neat tetrahydrofuran, mixed with 200 ml of dry hexane, was added into the reaction vessel over 15 minutes, the temperature was increased to 60° C. and agitation was continued for an additional hour. The temperature was increased to 70° C., the slurry was dried with a nitrogen purge for three (3) hours, and then cooled to room temperature, yielding 517 grams of a purple-colored, free-flowing product. The product contained 0.75 wt. % of Ti and 4.03 wt. % of V (theory).

EXAMPLE 2

(HDPE Preparation In a Fluid Bed Reactor)

The catalyst precursor of Example 1 was used in an 18 inch outside diameter gas phase fluid bed reactor to copolymerize ethylene with 1-hexene. The reactor was constructed and operated substantially in the manner of the fluid bed reactor described in the aforementioned Levine et al, Karol et al and Nowlin et al patents. Triethylaluminum (TEAL) was used as a catalyst activator (co-catalyst) in the reactor. Freon was also used as a catalyst activator and an MFR modifier in the reactor. The reactor operating conditions are listed below.

TABLE A

| Fluid Bed Polymerization Reactor Conditions | |
|---|---|
| Example | 2 |
| Gas Phase Hexene/Ethylene Molar Ratio | 0.023 |
| Gas Phase $H_2/C_2=$ molar ratio | 0.042 |
| Polymerization Temperature (°C.) | 87 |
| Ethylene Partial Pressure, psia | 175 |
| Reactor Pressure psig | 297 |
| Ethylene feed rate (lbs/hr) | 40.2 |
| Hexene feed rate (lbs/hr) | 0.6 |
| TEAL feed (ppm by weight based on production rate) | 333 |
| Polymer Production Rate (lbs/hr) | 30.4 |
| Freon/TEAL Molar Feed Ratio | 0.53 |

The polymer product had density of 0.945 g/cc, $I_{21}$ of 3.74 g/10 min and MFR of 144.

EXAMPLES 3-6

(HDPE Preparation in Fluid Bed Reactor)

Four (4) more polymerization runs were carried out in the fluid bed reactor of Example 2. Examples 5 and 6 were conducted with the catalyst precursor of Example 1, while Examples 3 and 4 with a catalyst precursor substantially the same as that of Example 1. In these Examples, the Freon:TEAL molar ratios were varied to produce polymers whose properties are listed below in Table B.

TABLE B

| | (HDPE Polymer Properties) | | | |
|---|---|---|---|---|
| Example | Freon: TEAL Molar Feed Ratio | Density (g/cc) | $I_{21}$ (g/10 min) | MFR ($I_{21}/I_2$) |
| 3 | 0.61 | 0.947 | 6.15 | 150 |
| 4 | 0.39 | 0.947 | 6.04 | 134 |
| 5 | 0.75 | 0.945 | 3.99 | 160 |
| 6 | 0.61 | 0.946 | 6.46 | 135 |

The polymer resins of Examples 2-6 were then extruded into 0.5 mil thickness films and strength properties of the films were measured. The results of the evaluation are summarized below in Table C.

TABLE C

| (HDPE Film Strength Properties) | | | |
|---|---|---|---|
| Film Made From Resin Of Example | Dart Drop (grams) | Elmendorf Tear, MD (grams/mil) | Elmendorf Tear, TD (grams/mil) |
| 2 | 234 | 13 | 38 |
| 3 | 222 | 12 | 72 |
| 4 | 254 | 11 | 76 |

TABLE C-continued (HDPE Film Strength Properties)

| Film Made From Resin Of Example | Dart Drop (grams) | Elmendorf Tear, MD (grams/mil) | Elmendorf Tear, TD (grams/mil) |
|---|---|---|---|
| 5 | 188 | 10 | 53 |
| 6 | 241 | 11 | 68 |

EXAMPLE 7

(Medium Density Polyethylene Preparation)

The catalyst precursor prepared substantially in the manner of Example 1 was used in this Example to evaluate the utility thereof for the polymerization of medium density resins. The evaluation was carried out in the fluid bed, gas phase polymerization reactor of Example 2. Triethylaluminum (TEAL) was used as a catalyst activator and Freon was also used in the reactor, for the same purpose as in Example 2.

The polymerization reaction was conducted in substantially the same manner as that of Examples 2-6, at the conditions listed below in Table D, and produced a medium density polymer product having the properties also listed in Table D.

TABLE D (Medium Density Ethylene/1-hexene Co-polymer

| 1. Polymerization Conditions | |
|---|---|
| Temperature °C. | 91 |
| Resin residence time in reactor (hrs) | 5.3 |
| Catalyst Productivity (lb resin/lb of catalyst) | 3000 |
| Gas phase 1-hexene/ethylene ($C_6^=/C_2^=$) mole ratio | 0.0613 |
| $H_2/C_2^=$ mole ratio | 0.0355 |
| $C_2^=$ partial pressure (psia) | 177 |
| TEAL content (ppmw, based on total reactor resin weight) | 339 |
| Freon:TEAL mole feed ratio | 0.8 |
| Reactor total pressure (psia) | 315 |
| 2. Polymer Properties | |
| Density (g/cc) | 0.9365 |
| $I_{21}$ (g/10 min) | 7.77 |
| MFR | 136 |

A resin from a different bath but having the same density and $I_{21}$ values and polymerized with a substantially the same catalyst as the resin of this example was extruded into a 0.5 and 1.0 mil films, the strength properties of the films were evaluated and they are summarized in Table E below.

TABLE E (Medium Density Film Strength Properties)

| Film Thickness | Dart Drop (grams) | Elmendorf Tear, MD (grams/mil) | Elmendorf Tear, TD (grams/mil) |
|---|---|---|---|
| 0.5 | 266 | 15 | 146 |
| 1.0 | 468 | 29 | 335 |

The data of Tables C and E indicates that the catalyst of this invention produces polyolefin resins which, when made into films, exhibit excellent strength properties.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adopt it to various diverse applications.

I claim:

1. A process for polymerizing at least one olefin comprising conducting the polymerization in the presence of a catalyst composition prepared by a method comprising the steps of:

(I) preparing a catalyst precursor by a method comprising:

(a) contacting a solid, porous carrier with an aluminum compound of the formula $$R_k AlZ_{(3-k)} \qquad (I)$$

where R is a $C_1$-$C_{10}$ alkyl group, Z is a halogen and k is 1, 2, or 3;

(b) contacting the product of step (a) with a mixture containing a vanadium compound of the formula $$VO_m X_{(n-2m)} \qquad (II)$$

where X is a halogen, m is 0 or 1 and n is 2,3,4 or 5, and a titanium compound of the formula $$TiX'_4 \qquad (III)$$

where X' is a halogen;

(c) contacting the product of step (b) with an ether selected from the group consisting of an alkyl ether having 2 to 18 carbon atoms, an alkyl/aryl ether having 2 to 18 carbon atoms, or a silane ether of the formula $$R''Si(OR''')_m R^{IV}_{(3-m)} \qquad (IV)$$

where R'', R''' and $R^{IV}$ are the same or different alkyl or aryl groups and m is 1,2,or 3; and (II) activating the precursor by combining it with an olefin polymerization catalyst activator.

2. A process of claim 1 which is conducted in the presence of a halogenating agent of the formula:

$$MH_n X''_{(p-n)}$$

where M is Si, C, Ge or Sn, X'' is a halogen, n is 0,1,2 or 3, and p is the valence of M.

3. A process of claim 2 wherein R is a $C_2$-$C_5$ alkyl

4. A process of claim 3 wherein R is an ethyl group.

5. A process of claim 4 wherein k is 3.

6. A process of claim 5 wherein X and X' are each the same or different and they are bromine or chlorine.

7. A process of claim 6 wherein X and X' are each chlorine.

8. A process of claim 7 wherein the vanadium compound of the formula (II) is vanadium oxytrichloride.

9. A process of claim 8 wherein the ether is a cyclic alkyl ether or a silane ether.

10. A process of claim 9 wherein the ether is a cyclic alkyl ether having 2 to 7 carbon atoms or a silane ether of the formula $$R'' Si(OR''')_m R^{IV}_{(3-m)}$$

where R'', R''', and RIV are the same or different alkyl or aryl groups and m is 1, 2 or 3.

11. A process of claim 10 wherein R'' is an aryl group and R''' and $R^{IV}$ are the same or different $C_1$-$C_4$ alkyl groups.

12. A process of claim 11 wherein the ether is tetrahydrofuran or phenyltrimethoxysilane.

13. A process of claim 12 wherein the ether is tetrahydrofuran.

14. A process of claim 13 wherein the amount of the tetrahydrofuran is about 0.1 to about 2.0 mmoles/gram of the carrier.

15. A process of claim 14 wherein the amount of the tetrahydrofuran is about 0.5 to about 1.5 mmoles/gram of the carrier.

16. A process of claim 15 wherein the amount of the tetrahydrofuran is about 1.0 mmole/gram of the carrier.

17. A process of claim 16 wherein the molar ratio of V per weight unit of the carrier is about 0.3 to about 2.0 mmole/gram of the carrier.

18. A process of claim 17 wherein the molar ratio of V per weight unit of the carrier is about 0.7 to about 1.3 mmole/gram of the carrier.

19. A process of claim 18 wherein the molar ratio of V per weight unit of the carrier is about 1.0 mmole/gram of the carrier.

20. A process of claim 19 wherein the molar ratio of Ti per unit weight of the carrier is about 0.05 to about 1.0 mmoles/gram of the carrier.

21. A process of claim 20 wherein the molar ratio of Ti per unit weight of the carrier is about 0.1 to about 0.4 mmoles/gram of the carrier.

22. A process of claim 21 wherein the molar ratio of Ti per unit weight of the carrier is about 0.2 mmoles/gram of the carrier.

* * * * *

UNITED STATES PATENT AND TRADEMARK OFFICE
CERTIFICATE OF CORRECTION

PATENT NO. : 5,006,618

DATED : April 9, 1991

INVENTOR(S) : Nemesio D. Miro

It is certified that error appears in the above-identified patent and that said Letters Patent is hereby corrected as shown below:

Column 14, line 52, claim 3, after "alkyl" add --group.--

Signed and Sealed this

First Day of September, 1992

Attest:

DOUGLAS B. COMER

*Attesting Officer*  *Acting Commissioner of Patents and Trademarks*